United States Patent [19]
Banick et al.

[11] 4,247,077
[45] Jan. 27, 1981

[54] SLOW-OPENING VALVE OPERATED BY A SOLENOID PUMP

[75] Inventors: Gerard S. Banick, W. Orange; Peter W. Van Seggern, Florham Park, both of N.J.

[73] Assignee: Automatic Switch Company, Florham Park, N.J.

[21] Appl. No.: 50,386

[22] Filed: Jun. 20, 1979

[51] Int. Cl.³ .............. F16K 31/04; F16K 31/122
[52] U.S. Cl. .............................. 251/25; 251/57; 60/432; 60/477
[58] Field of Search .............. 251/25, 57; 60/432, 60/477

[56] References Cited
U.S. PATENT DOCUMENTS

| | | |
|---|---|---|
| 2,948,118 | 8/1960 | Carlson, Jr. et al. ............ 251/57 X |
| 3,051,432 | 8/1962 | Sullivan ............................ 251/57 X |
| 3,120,103 | 2/1964 | Beard et al. ..................... 60/432 X |
| 3,175,500 | 3/1965 | Zeigler ............................. 60/432 X |
| 3,200,591 | 8/1965 | Ray ................................... 60/432 |
| 4,054,155 | 10/1977 | Hill ................................... 251/25 X |

*Primary Examiner*—Arnold Rosenthal
*Attorney, Agent, or Firm*—Alan H. Levine

[57] ABSTRACT

A slow-opening valve including a main valve, a chamber for receiving a control fluid other than that controlled by the main valve, and a member within the chamber responsive to the volume of control fluid in the chamber for opening and closing the main valve. A solenoid pump, including an armature and an electrical solenoid for vibrating the armature, produces fluid flow in small increments with respect to the chamber to effect opening of the valve. An auxiliary valve, which opens and closes in response to the position of the solenoid pump armature, controls flow of fluid with respect to the chamber for closing the main valve.

12 Claims, 5 Drawing Figures

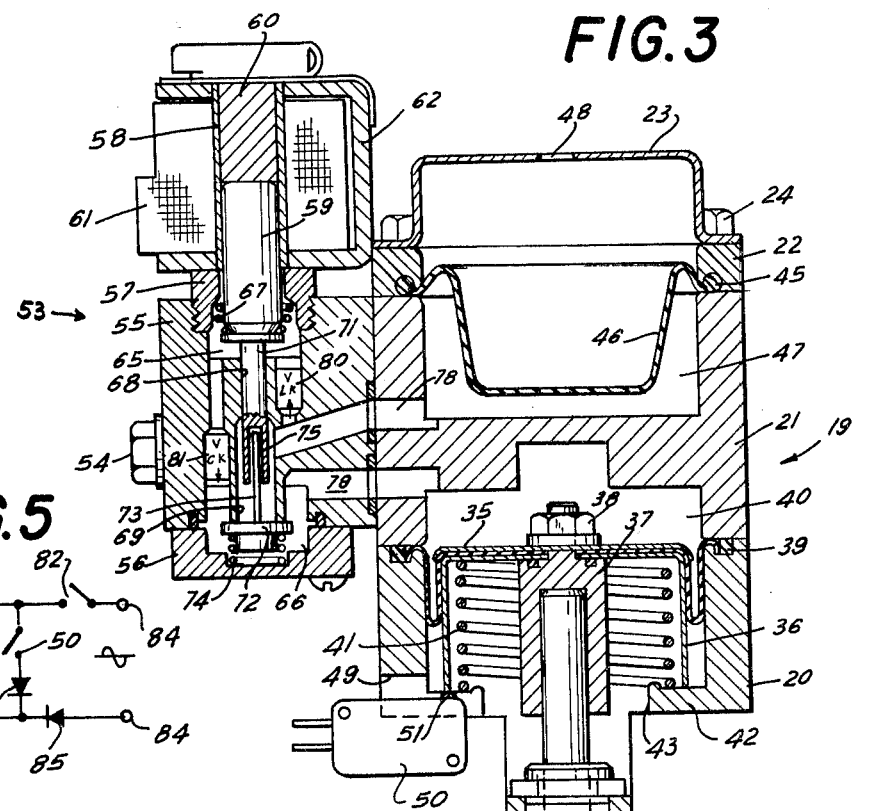
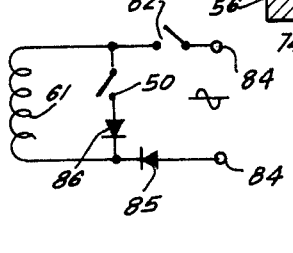
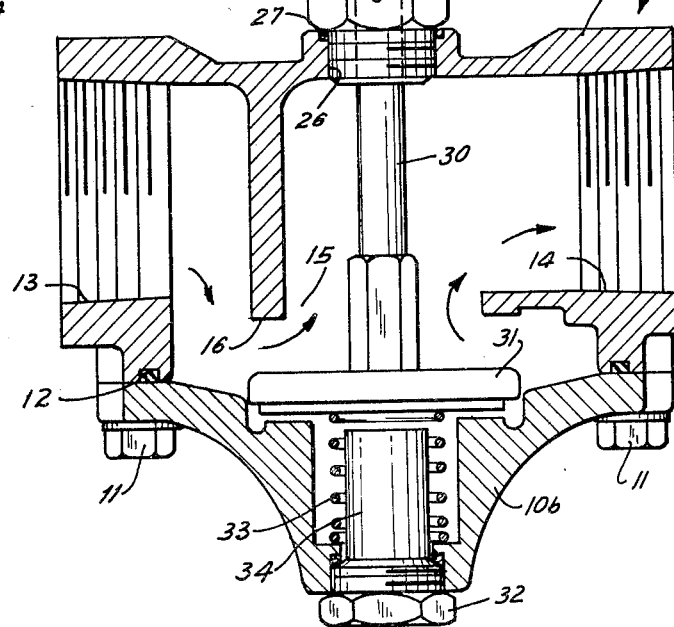

SLOW-OPENING VALVE OPERATED BY A SOLENOID PUMP

This invention relates to valves for controlling fluid flow, and more particularly to valves which open very slowly to gradually initiate fluid flow.

One environment in which the present invention finds utility is the gas combustion field, e.g., large space heating installations and heat treating ovens. Typically, two solenoid-operated valves are employed to control gas flow. One valve provides low volume gas flow to feed the pilot light, and the second valve provides high volume flow for heating. Since a solenoid valve opens very quickly, when the second valve is opened the high volume rush of gas sometimes extinguishes the pilot light. Hence, a slow opening valve is desirable in this circumstance. Motorized valves for slow opening are available, but these are complicated and relatively expensive to install, operate, and maintain.

It is an object of the present invention to provide a valve which opens slowly in response to the low volume feed of a control fluid by a solenoid pump.

It is another object of the invention to provide such a valve which closes quickly when flow of the main fluid is to be terminated.

It is an important object of the invention to provide a main valve which opens in response to low volume feed of a control fluid by a solenoid pump, and which includes an auxiliary valve for controlling the flow of the control fluid, in a direction opposite to the direction in which the control fluid is pumped, for closing the main valve, and wherein the auxiliary valve is operated by the armature of the solenoid pump.

It is a further object of the invention to provide such a valve wherein the control fluid is within a closed system including a reservoir and a chamber, the solenoid pump and auxiliary valve controlling the flow of the control fluid between the reservoir and chamber.

It is an additional object of the invention to provide such a valve wherein one wall of one or each of the reservoir and chamber is formed by a flexible diaphragm.

It is another object of the invention to provide a solenoid pump operated valve including an electrical circuit for energizing the solenoid of the pump with half-wave rectified alternating current to cause vibration of the pump armature.

It is a further object of the invention to provide such a valve wherein a switch responds to the main valve member reaching its fully open position for changing the energization of the solenoid to discontinue vibration of the armature and hence terminate the pumping action.

Additional objects and features of the invention will be apparent from the following description in which reference is made to the accompanying drawings.

In the drawings:

FIG. 3 is a view similar to FIG. 1 showing the valve in fully open condition;

FIG. 4 is a schematic representation of an electrical circuit for energizing the solenoid coil of the pump; and FIG. 5 is a schematic representation of an alternative electrical circuit for energizing the solenoid coil of the pump.

Figure 1:
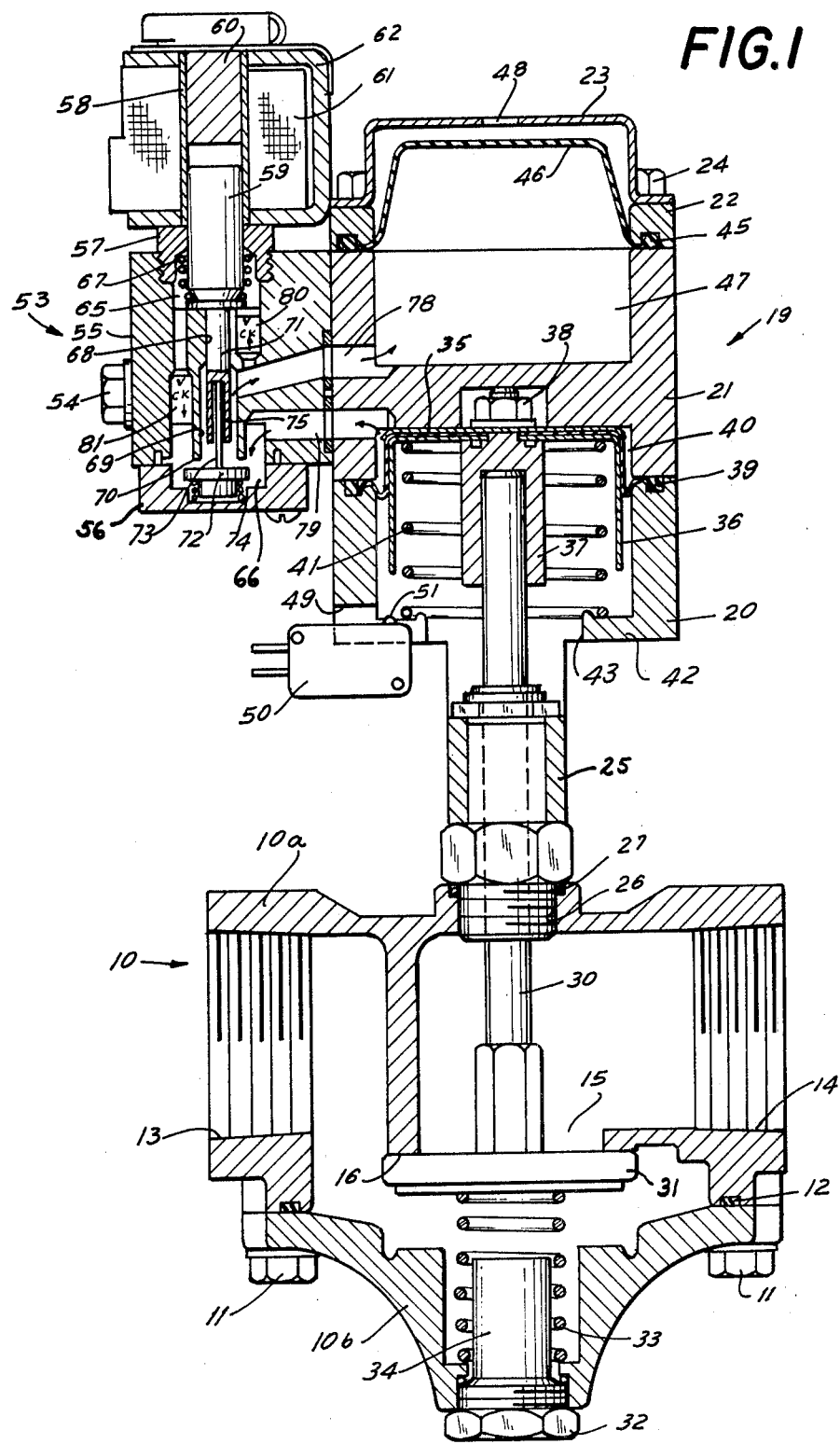
FIG. 1 is longitudinal cross-sectional view through a valve according to the present invention, the main valve being in closed condition.

The valve chosen to illustrate the present invention includes a valve body 10 comprising an upper valve body portion 10a and a lower valve body portion 10b joined together by bolts 11. The connection between the body parts is made fluid tight by a seal 12 between them. Upper body portion 10a is formed with an inlet port 13, for connection to a pressurized source of a main fluid to be controlled, an outlet port 14, and an orifice 15 between those ports surrounded by a valve seat 16.

Mounted on upper body portion 10a is a valve actuator assembly 19 comprising a lower body part 20, an intermediate body part 21, an upper body part 22, and a cap 23, all joined together by bolts 24. At its lower end, lower body part 22 terminates in a tubular neck 25 threaded into a bore 26 in body portion 10a, the connection being rendered fluid tight by use of a seal 27.

Slidable longitudinally within neck 25, in a fluid-tight manner, is a stem 30, the stem carrying a main valve member 31 at its lower end. Valve member 31 is capable of engaging valve seat 16 to close the main valve (as shown in FIG. 1). A plug 32, threaded into a bore in lower body portion 10b, presents a post 34 surrounded by a compression spring 33. One end of spring 33 bears against valve member 31 to constantly yrge the valve member toward valve seat 16.

The upper end of stem 30 is located within the hollow main portion of lower body part 20, which also accommodates a flexible diaphragm 35, of rubber or rubberlike material, and an inverted cup-shaped back-up member 36, of a rigid material. A collar 37, fixed to the upper end of stem 30, has a reduced diameter upper end projecting through aligned holes in member 36 and a diaphragm 35, and a nut 38 threaded on to the upper end of collar 37 secures the collar, diaphragm and back-up member together so that all these parts move with stem 30. The margin 39 of diaphragm 35 is sandwiched between lower body part 20 and intermediate body part 21, and is thickened to serve as a fluid seal between those parts. The region between the upper face of diaphragm 35 and intermediate part 21 defines a fluid-tight chamber 40. A compression spring 41, surrounding stem 30 and collar 37, seats at one end against back-up member 36 and at the other end against an inwardly-projecting flange 42 of body part 20. Spring 41 constantly urges member 36 and diaphragm 35 in a direction which reduces the volume of chamber 40.

The region beneath diaphragm 35 is open to the atmosphere through the opening 43 defined by the inner surface of flange 42. Flange 42 is formed with a slot 49 within which an electric switch 50 is mounted. The actuator 51 of switch 50 is located in the path of downward movement of an edge of back-up member 36. When diaphragm 35 and member 36 reach a position defining to the maximum volume of chamber 40 (FIG. 3), corresponding in this example to the fully open position of main valve member 31, the edge of member 36 engages actuator 51 and operates switch 50.

Sandwiched between intermediate body part 21 and upper body part 22 is the margin 45 of another flexible diaphragm 46, of rubber or rubberlike material, the margin being thickened to serve as a fluid seal between the body parts. The region between the lower face of diaphragm 46 and intermediate body part 21 defines a reservoir 47 of variable volume. Protective cap 23 is provided with a hole 48 for passage of air into and out of the space between diaphragm 46 and cap 23.

Mounted on one side of valve actuator assembly 19, by bolts 54 (only one being shown), is a solenoid pump assembly 53. The assembly includes a pump body 55, a bottom plate 56 secured to the body, and a bonnet 57 threaded into the top of body 55. Projecting upwardly from bonnet 57 is a non-magnetic tube 58 within which a magnetic armature 59 is longitudinally slidable, a magnetic plug nut 60 being fixed within the upper end of the tube. An electric solenoid 61 surrounds tube 58, the solenoid being located within a magnetic yoke 62. Upon steady-state energization of solenoid 61, armature 59 rises into engagement with plug nut 60, as shown in FIG. 3.

Pump body 55 defines together with bonnet 57 a space 65, and together with bottom plate 56 a space 66. A compression spring 67 within space 65 engages armature 59 and constantly urges it in a direction away from plug nut 60. Extending between spaces 65 and 66 is a smaller diameter bore 68 merging into a larger diameter bore 69, the latter terminating at its lower end in an auxiliary valve set 70. Snugly but slidably arranged within bore 68 is a plunger 71, the upper end of which is fixed to the lower end of armature 59. An auxiliary valve member 72, located in space 66, is fixed to the lower end of a stem 73, the stem being accommodated loosely within an axial bore 75 in the lower portion of plunger 71. A compression spring 74, within space 66, constantly urges auxiliary valve member 72 toward auxiliary valve seat 70 to close the auxiliary valve, this condition being shown in FIGS. 2 and 3.

Reservoir 47 is in constant communication with bore 69 through a passageway 78, and chamber 40 is in constant communication with space 66 through a passageway 79. Since each of passageways 78 and 79 extends through both intermediate body part 21 and pump body 55, a suitable seal surrounds each passageway at the interface between part 21 and body 55. A passageway including a check valve 80 extends between passageway 78 and space 65, and a passageway including a check valve 81 extends between space 65 and space 66. Each check valve permits fluid flow in only one direction, check valve 80 permitting flow from passageway 78 to space 65, and check valve 81 permitting flow from space 65 to space 66.

Reservoir 47, chamber 40, and solenoid pump assembly 53 comprise a closed fluid system filled with a suitable control fluid, such as a conventional hydraulic liquid. Two parallel paths are available for fluid flow between reservoir 47 and chamber 40. One path includes (as indicated by the arrows in FIG. 2) passageway 78, check valve 80, space 65, check valve 81, space 66, and passageway 79. The other path includes (as indicated by the arrows in FIG. 1) passageway 79, auxiliary valve 70, 72 (when open), bore 69, and passageway 78.

A circuit for energizing solenoid coil 61 is indicated in FIG. 4, the circuit including a source of alternating current power represented by terminals 84. The circuit also includes a switch 82, coil 61, and switch 50 connected in series, switch 50 being shunted by a diode 83. Switch 82 may be controlled by a thermostat so that it closes when the space being monitored by the thermostat requires more heat, and hence opening of main valve 10 to permit flow of combustible gas. When switch 82 closes, but switch 50 is open, half-wave rectified current is applied to solenoid coil 61, causing armature 59 to vibrate longitudinally. Upon closing of switch 50, full wave current is applied to solenoid 61 and armature 59 is pulled to a stationary position against plug nut 60.

An alternative circuit for energizing solenoid 61 is shown in FIG. 5. Switch 82, solenoid 61, and a diode 85 are connected in series to AC power source 84. A series circuit comprising switch 50 and another diode 86 is shunted across solenoid 61. When switch 82 closes, but switch 50 is open, half-wave rectified current is applied to coil 61, causing armature 59 to vibrate longitudinally. Upon closing of switch 50, a series circuit is completed including solenoid 61, switch 50 and diode 86. Thus, as the magnetic field around solenoid coil 61 collapses between the periodic half waves of current applied to it from source 84, the current induced in coil 61 by the collapsing field circulates through switch 50, diode 86, and the coil to maintain coil 61 energized. The result is the same as if full wave current is applied to the coil, and armature 59 is pulled to a stationary position against plug nut 60.

To explain the operation of the valve, it will be assumed that the parts are in the condition shown in FIG. 1, wherein main valve 10 is closed, and solenoid 61 is deenergized, i.e., switch 82 is open. Spring 67, which is stronger than spring 74, holds armature 59 in its lowermost position in which it pushes plunger 71 completely into bore 68. Plunger 71 in turn pushes stem 73 downwardly to hold auxiliary valve member 72 away from valve seat 70. Spring 33 holds main valve member 31 against valve seat 16, and spring 41 raises diaphragm 35 so that chamber 40 has its smallest volume. Reservoir 47 has its largest volume. Switch 50 is open since actuator 51 is not engaged by member 36.

If switch 82 of either of FIGS. 4 and 5 is now closed, solenoid coil 61 is energized periodically by every other half wave of alternating current power, and is deenergized during the alternate half waves. During each half wave energization of coil 61, armature 59 is pulled toward plug nut 60. Before the armature actually contacts the plug nut, coil 61 is deenergized and spring 67 returns armature 59 downwardly. When armature 59 rises toward plug nut 60, spring 74 lifts auxiliary valve member 72 into engagement with auxiliary valve seat 70, thereby closing the auxiliary valve. Downward movement of armature 59, under the influence of spring 67, terminates before the top wall of bore 75 in plunger 71 engages the top of stem 73, because coil 61 is energized again by the next half cycle of current again raising armature 59, and hence plunger 71, toward plug nut 60. Continued half wave energization of solenoid coil 61 produces continuous longitudinal vibratory movement of armature 59, as described above. Throughout its vibratory movement, armature 59 never strikes plug nut 60, so as to avoid noise and damage to the parts, and the top wall of bore 75 in plunger 71 never engages the upper end of stem 73, so that auxiliary valve 70, 72 remains closed.

Figure 2:
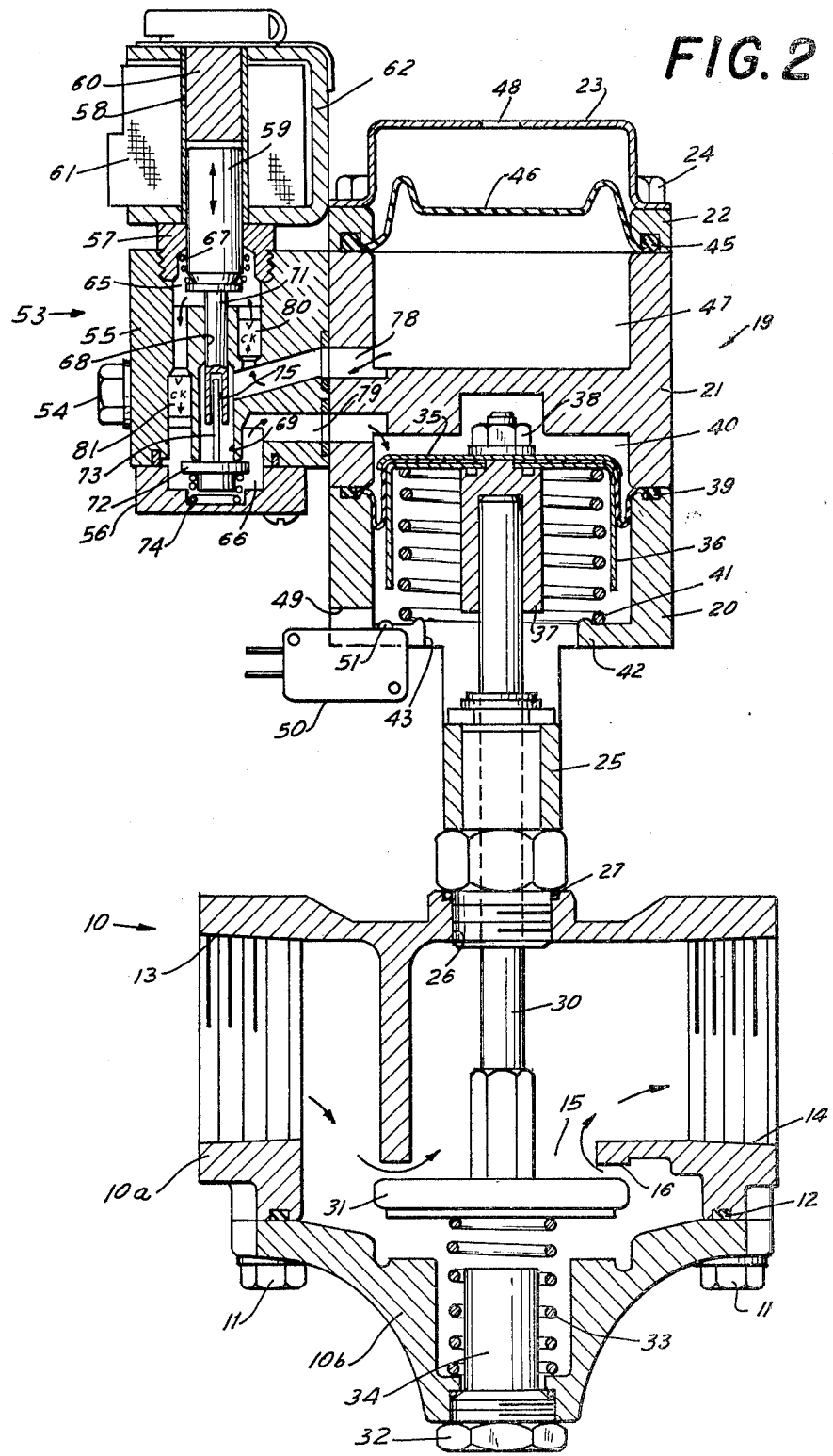
FIG. 2 is a view similar to FIG. 1 showing the valve in a partially open condition.

FIG. 2 illustrates the valve while armature 59 is vibrating. When the armature is at its point of closest approach to plug nut 60, plunger 71 extends upwardly into space 65 a maximum amount. Consequently, the available volume of space 65 for accommodating control fluid is a minimum. As armature 59 moves downwardly to its point of vibratory movement farthest from plug nut 60, plunger 71 extends into space 65 a lesser and lesser amount. Consequently, the available volume of space 65 for accommodating control fluid increases, and hence the pressure in space 65 tends to decrease. The decreased pressure causes control fluid to flow from reservoir 47, through passageway 78 and check valve 80 into space 65. No fluid can flow from space 66 to space 65 because of the presence of check valve 81, and no fluid can flow through bore 69 because auxiliary valve 70, 72 is closed.

As armature 59 moves upwardly again in its vibratory movement, plunger 71 rises into space 65 to a greater and greater extend thereby increasing the pressure in space 65. As a result, control fluid is pushed from space 65, through check valve 81, into space 66, from which it flows through passageway 79 into chamber 40. No fluid flows from space 65 into reservoir 47 because of the presence of check valve 80. Thus, it will be seen that each downward vibratory movement of plunger 71 draws control fluid from reservoir 47 into space 65, and each upward vibratory movement of plunger 71 pumps control fluid from space 65 into chamber 40.

As control fluid is pumped into chamber 40, the volume of the chamber must increase, and so diaphragm 35 and back-up member 36 move downwardly against the force of spring 41. This downward movement is transmitted through stem 30 to main valve member 31, and therefore the latter moves away from valve seat 16, against the force of spring 33, opening the main valve. Since the incremental amount of control fluid flow resulting from each pumping movement of plunger 71 is quite small, movement of diaphragm 35 and hence of main valve member 31 is very slow, so that the main valve opens very gradually. During this operation, diaphragm 46 descends to effectively decrease the volume of reservoir 47 as control fluid is pumped out of it.

The valve-opening movement described above continues until, as shown in FIG. 3, the main valve is fully open and the edge of back-up member 36 engages actuator 51 to close switch 50. As explained above with reference to FIGS. 4 and 5, closing of switch 50 produces a continuous energization of solenoid coil 61, in place of the previous periodic energization and deenergization of the coil, as a result of which armature 59 is held stationary against plug nut 60. With discontinuance of vibration of plunger 71, pumping of the control fluid ceases, and the control fluid pressure in chamber 40 holds the main valve open.

Should the pressure in chamber 40 drop due to leakage of control fluid past auxiliary valve 70, 72, or past check valves 80 and 81, or past any of the seals, the assembly of valve member 31, stem 30, and member 36 will rise slightly. As a result, switch 50 will open thereby restarting the vibration of armature 59 and the pumping action of plunger 71. The control fluid thus pumped into chamber 40 will return main valve member 31 to its fully open condition, at which point switch 50 will be closed again and pumping terminated.

When it is desired to close the main valve, as shown in FIG. 1, solenoid coil 61 is deenergized by opening switch 82. Spring 67 is now free to move armature 59 to its lowermost position, in which plunger 71 pushes stem 73 downwardly to open auxiliary valve 70, 72 (FIG. 1). Due to the constant upward pressure of spring 41, diaphragm 35 rises pushing the control fluid out of chamber 40, through passageway 79, open auxiliary valve 70, 72, bore 69, and passageway 78 into reservoir 47. Diaphragm 46 rises to permit the reservoir to accept the fluid. In contrast to the slow, incremental flow of control fluid from reservoir 47 to chamber 40, the reverse flow from chamber 40 to reservoir 47 is steady and continuous, and hence main valve member 31 rises quickly into engagement with main valve seat 16 to close the main valve.

It will be seen that, according to the present invention, the same solenoid armature 59 which vibrates to cause pumping of control fluid for opening the main valve also serves to open auxiliary valve 70, 72 for relieving pressure in chamber 40 to close the main valve.

While it is believed that the invention will be understood clearly from the description above, it may be helpful to give an example of specific valves for some of the solenoid pump assembly parts. It has been found that using 60 cycle AC power and a control fluid having the viscosity of kerosene, armature 59 will vibrate at 60 cycles per second with a stroke of 0.166 inch where: (a) solenoid coil 61 produces a pull of about three pounds with only one diode (83 or 85) in series with the coil, and a pull of about seven pounds when there are two diodes in the circuit (i.e. switch 50 closed) and the armature engages plug nut 60, (b) auxiliary valve seat 70 has a diameter of 0.187 inch and springs 33 and 41 provide a pressure of fifteen pounds per square inch (psi), and (c) spring 67 provides a pressure of one pound psi when extended, i.e, for opening auxiliary valve 70, 72, and a pressure of five psi when contracted at the highest point of armature 59 during its vibration. The five psi value insures that the armature does not strike plug nut 60 during vibratory movement, since only three pounds of attractive force is present at that time, but permits the armature to be attracted to the plug nut when switch 50 closes, since seven pounds of attractive force is present at that time.

Although in the present example the solenoid pump moves control fluid from reservoir 47 to chamber 40 to open the main valve, the operation could be reversed. If main valve member 31 is located above valve seat 16, instead of below it, control fluid would be pumped from chamber 40 to reservoir 47 to open the main valve.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A slow-opening and quick-closing valve comprising:
    (a) a main valve body having an inlet port, an outlet port, and an orifice between said ports surrounded by a valve seat,
    (b) a main valve member movable into engagement with, and away from, said valve seat to close and open the valve, respectively,
    (c) a chamber for receiving a control fluid other than the fluid controlled by said main valve member,
    (d) means responsive to the volume of control fluid in said chamber for positioning said valve member with respect to said valve seat,
    (e) a solenoid pump serving to pump fluid in one direction for changing the volume of control fluid in said chamber to open the main valve, said pump including an armature and an electrical solenoid for vibrating said armature to produce, with each vibration, incremental flow of control fluid with respect to said chamber, and (f) an auxiliary valve responsive to movement of said solenoid pump armature to a particular stationary position for opening said auxiliary valve to permit control fluid flow in the direction opposite to that in which the solenoid pump moves the control fluid for changing the volume of control fluid in said chamber so as to close the main valve.

2. A slow-opening valve as defined in claim 1 wherein said chamber and solenoid pump are part of a closed fluid system.

3. A slow-opening valve as defined in claim 2 wherein said closed fluid system includes a reservoir, said solenoid pump serving to pump fluid in one direction between said reservoir and chamber.

4. A slow-opening valve as defined in claim 1 wherein said closed fluid system includes two parallel branches between said reservoir and chamber, one of said branches including said auxiliary valve, and the other of said branches including check valve means permitting flow only in the direction in which fluid is pumped to open the main valve.

5. A slow-opening valve as defined in claim 1 including a member within said chamber movable in response to change in volume of fluid within said chamber, and means for transmitting movement of said member to said main valve member.

6. A slow-opening valve as defined in claim 5 wherein said member includes a flexible diaphragm forming a wall of said chamber.

7. A slow-opening valve as defined in claim 6 wherein pumping of fluid by said solenoid pump produces movement of said diaphragm in one direction for effectively changing the volume of said chamber, and including resilient means for constantly urging said diaphragm in the opposite direction.

8. A slow-opening valve as defined in claim 1 including a reservoir between which and said chamber said solenoid pump moves fluid, said reservoir including at least one movable wall for effectively changing the volume of said reservoir with changes in volume of fluid within said reservoir.

9. A slow-opening valve as defined in claim 8 wherein said movable wall comprises a flexible diaphragm.

10. A slow-opening valve as defined in claim 1 including an electrical circuit for energizing said solenoid in a manner to produce vibration of said armature, and means in said circuit responsive to said main valve member reaching its fully open condition for changing the energization of said solenoid to terminate the vibration of said armature and hence the pumping action of said solenoid pump.

11. A slow-opening valve as defined in claim 10 wherein said electrical circuit includes a source of alternating current, and said means in said circuit includes a diode and switch for controlling the connection of said diode to said solenoid.

12. A slow-opening and quick-closing valve comprising:
(a) a main valve body having an inlet port, an outlet port, and an orifice between said ports surrounded by a valve seat,
(b) a main valve member movable into engagement with and away from, said valve seat to close and open the valve, respectively,
(c) a chamber for receiving a control fluid other than the fluid controlled by said main valve member,
(d) means responsive to the volume of control fluid in said chamber for positioning said valve member with respect to said valve seat,
(e) a solenoid pump for changing the volume of control fluid in said chamber to open the main valve, said pump including an armature and an electrical solenoid for vibrating said armature to produce, with each vibration, incremental flow of control fluid with respect to said chamber,
(f) a reservoir for accommodating control fluid, said solenoid pump serving to pump fluid only from said reservoir to said chamber to effect opening of said main valve, and
(g) an auxiliary valve for controlling fluid flow from said chamber to said reservoir to effect closing of said main valve, the condition of said auxiliary valve being responsive to the position of said solenoid pump armature.

* * * * *